May 18, 1965

H. W. TREVASKIS 3,183,751

APPARATUS FOR CUTTING LENGTHS OF RUBBER OR
RUBBER-LIKE MATERIAL FROM STRIPS OR SHEETS

Filed Sept. 26, 1961

Inventor
Henry William Trevaskis
by Benj. T. Rauber
attorney

May 18, 1965

H. W. TREVASKIS 3,183,751

APPARATUS FOR CUTTING LENGTHS OF RUBBER OR
RUBBER-LIKE MATERIAL FROM STRIPS OR SHEETS

Filed Sept. 26, 1961

Inventor:
Henry William Trevaskis
by Benj. T. Rauber
attorney 3,183,751
APPARATUS FOR CUTTING LENGTHS OF RUB-
BER OR RUBBER-LIKE MATERIAL FROM
STRIPS OR SHEETS
Henry William Trevaskis, Pointe Pleasant, Blackdown,
near Leamington Spa, England, assignor to Dunlop
Rubber Company Limited, London, England, a British
company
Filed Sept. 26, 1961, Ser. No. 140,789
Claims priority, application Great Britain, Oct. 5, 1960,
34,079/60
14 Claims. (Cl. 83—156)

This invention relates to apparatus for cutting lengths of rubber or rubber-like material from strips or sheets.

According to the invention apparatus for severing a length from a strip or sheet of rubber or rubber-like material comprises a fixed blade, a rotatable cutter having a radially projecting blade of elongated shape extending helically or substantially helically around the cutter axis, a feeding means for the material having a guide channel disposed to feed said material substantially tangentially to said cutter so as to provide a chamfered edge on said material when severed, and means for rotating the cutter to sever the material along said fixed blade progressively from one side to the other.

Preferably, apparatus as defined above is used in conjunction with a tyre building former for supplying lengths of tyre building material thereto, and means is provided for actuating the means for rotating the cutter when a predetermined length of material has been fed past the fixed blade.

The utilizable length of the helically extending blade of the cutter subtends an angle of less than 180°, preferably of the order of 30° with respect to the axis of rotation of the cutter, and it is essential that the subtended angle should be substantially less than 360° to enable the strip or sheet of material from which the length is to be severed to pass clear of the cutter blade both before and after the cutting operation.

One embodiment of the invention will now be described, with reference to the accompanying drawings in which.

Figure 1:
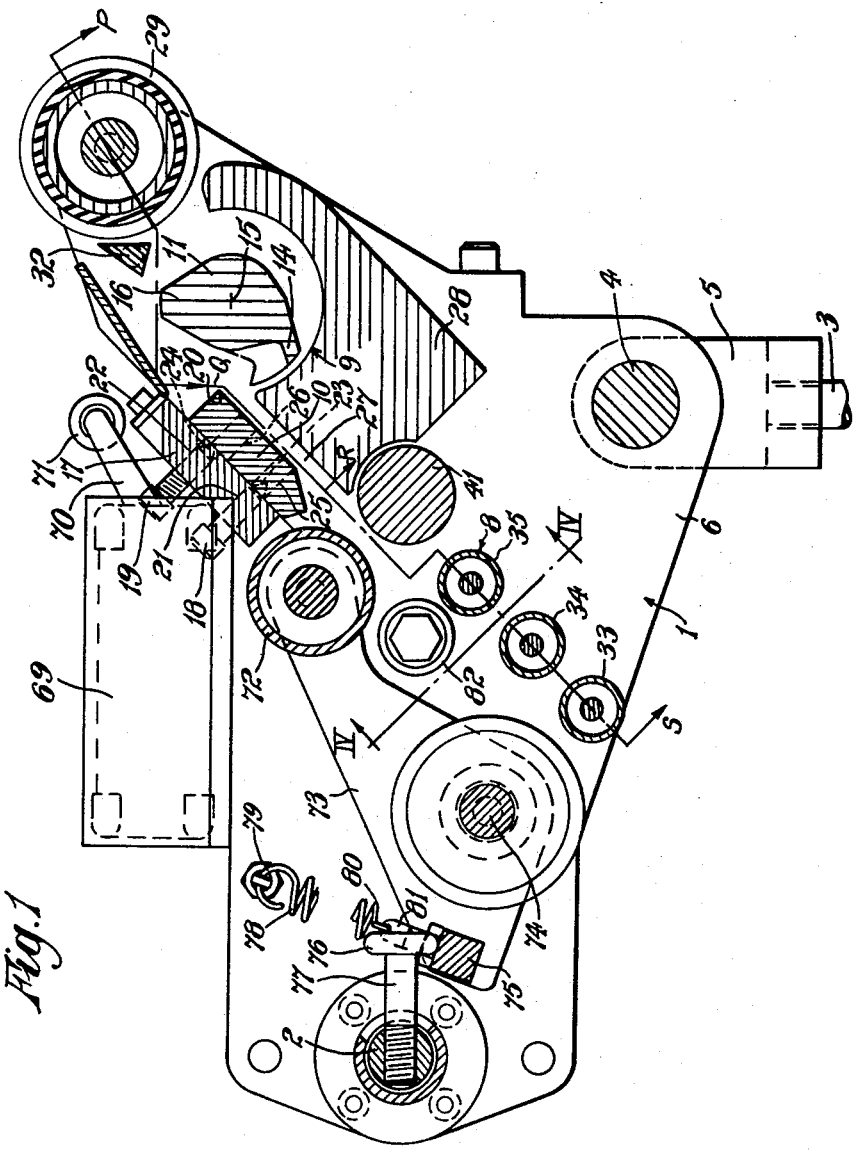
FIGURE 1 is a cross-sectional side elevation, taken on the line I—I of FIGURE 3, of apparatus for supplying severed lengths of unvulcanised tread rubber to a tyre building former.

The apparatus shown in FIGURE 1 comprises a supporting frame 1 pivoted on a shaft 2 attached to a rigid support (not shown) and positioned centrally beneath a rotatable tyre building former (not shown), the axis of the former being parallel to the axis of the shaft 2. The supporting frame 1 is movable towards or away from the rotatable former by means of a pneumatic cylinder and piston (not shown), the piston having a connecting rod 3 connected to the supporting frame 1 by a pin 4 rotatably supported in the supporting frame 1 and connected to the connecting rod 3 by a shackle 5.

Figure 3:
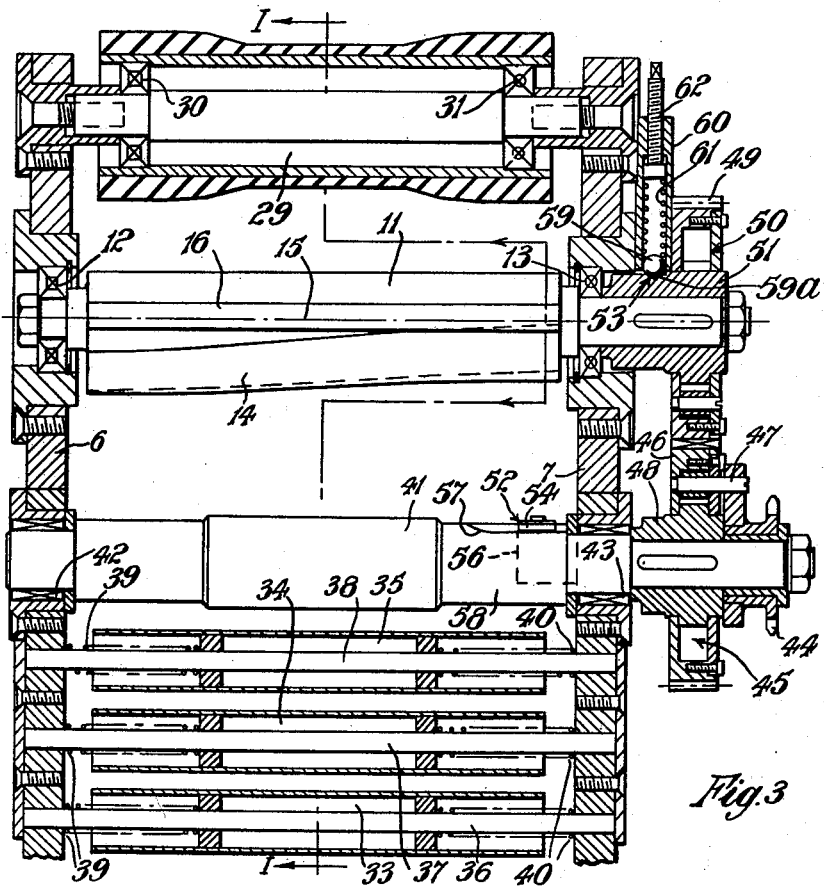
FIGURE 3 is a cross-sectional view taken on the line PQRS of FIGURE 1.

The supporting frame 1 comprises a pair of side members 6 and 7 (see FIGURE 3) in which a feeding means comprising a roller mechanism 8, and a cutting mechanism 9, are supported.

The cutting mechanism 9 consists of a fixed blade 10 which is secured to the supporting frame 1, and a rotatable cutter 11 which is mounted in bearings 12 and 13 carried, respectively, in the side members 6 and 7. The cutter 11 is provided with a substantially radially projecting integral knife blade 14 which extends helically around the cutter, the angle subtended by the blade 14 with regard to a plane coincident with the axis 15 of the cutter being 30°. A radially extending projection 16 is provided on the side of the cutter 11 opposite to the blade 14 for a purpose to be described. The fixed blade 10 is secured to the supporting frame 1 by means of four bolts (not shown) passing through elongated slots (not shown) in a block 17 attached to the supporting frame 1 and screwed into tapped holes (not shown) in the blade 10.

A pair of adjusting screws 18 and 19 are provided to enable any wear which may develop between the cutting edge 20 of the blade 10 and the blade 14 to be taken up. The adjusting screws 18 and 19 are located respectively in tapped holes 21 and 22 in the block 17 and have conical ends 23 and 24 respectively which project, respectively, into holes 25 and 26 drilled in the blade 10. The distance between the holes 25 and 26 is slightly less than that between the holes 21 and 22 and thus the position of the blade 10 is dependent on the relative extent to which the screws 18 and 19 are screwed down.

A guide channel 27, comprising part of the feeding means, is formed between the blade 10 and a block 28 attached to the supporting frame 1, for feeding a continuous strip of tread rubber tangentially to the cutter 11, which is rotatable by means to be described in order to sever the tread strip progressively from one side to the other by shearing it between the blades 10 and 14.

A freely rotatable rubber-covered consolidating roller 29, mounted in bearings 30 and 31 attached respectively to the side members 6 and 7 is provided for pressing the strip of tread rubber, fed through the guide channel 27 past the cutter 11 and over a guide bar 32 against the surface of a tyre carcass supported on the rotatable former.

The roller mechanism 8 comprises three freely rotatable rollers 33, 34 and 35 which are mounted respectively on shafts 36, 37 and 38 carried by the side members 6 and 7, the rollers being held centrally with respect to the supporting frame 1 by opposed coil springs 39 and 40, one pair for each roller. A knurled feed roller 41 is supported in bearings 42 and 43 attached to the side members 6 and 7 respectively, and is rotatable by a sprocket 44 via a feed roller ratchet 45. The ratchet 45 comprises an outer gear ring 46 which is connected by a pin 47 to the sprocket 44, and an inner member 48 which is driven by the outer gear ring when the sprocket 44 is rotated in a clockwise direction (see FIGURE 2). When the sprocket 44 is rotated in an anti-clockwise direction, the outer gear ring 46 rotates freely, without driving the inner member 48.

The teeth of the gear ring 46 are meshed with a similar gear ring 49 forming the outer member of a cutter ratchet 50 the inner member 51 of which is drivably connected to the cutter 11. The ratchet 50 is arranged so that when the sprocket 44 is rotated in the anti-clockwise direction (see FIGURE 2), the consequent clockwise rotation of the outer member 49 is transmitted to the inner member 51 to rotate the cutter. When the sprocket 44 is rotated in a clockwise direction, the consequent anti-clockwise rotation of the outer member 49 is not transmitted to the inner member 51, which thus remains stationary.

Both the feed roller and the cutter 11 are designed to rotate for exactly 360° at each operation of the apparatus, and stops 52 and 53 respectively are provided to give a positive location to these components at the end of each revolution. The stop 52 consists of a claw 54 fixed to a flat spring 55 attached to the supporting frame 1 by a block 56, the claw 54 engaging an axially extending groove 57 formed in an end portion 58 of the feed roller 41. The stop 53 comprises a ball 59 contained in a housing 60 and pressed by a coil spring 61 into engagement with a conical recess 59a formed in the member 51. The pressure exerted by the coil spring 61 on the ball 59 may be adjusted by means of a screw 62. The stops 52 and 53 do not lock, respectively, the feed roller 41 and the cutter 11 rigidly in position when they are engaged, and may be over-ridden by rotation of the sprocket 44 by the mechanism to be described.

The sprocket 44 is rotatable by a chain 63 (see FIGURE 2) which passes around the sprocket and is joined at its ends to connecting rods 64 and 65 attached to the respective pistons (not shown) of a pair of pneumatic cylinders and pistons 66 and 67 which are mounted on a supporting plate 68 bolted to the frame 1. The lengths of stroke of each of the pistons and cylinders 66 and 67 are such that actuation of either piston and cylinder will cause the sprocket 44 to be rotated for one revolution, the piston and cylinder 66 serving to rotate the sprocket in a clockwise direction (see FIGURE 2) and the piston and cylinder 67 serving to rotate the sprocket in an anti-clockwise direction. A control element in the form of a switch 69 having an operating arm 70 carrying at its end a freely rotatable roller 71 is fixed to the upper surface of the supporting frame 1, and is connected to a conventional electro-pneumatic control system for actuating the piston and cylinder mechanism 67 in a manner to be described.

The feeding means 8 also comprises a freely rotatable pressure roller 72 supported with its axis parallel to that of the roller 41 by one end of a bell-crank lever 73 which is pivoted on a shaft 74 attached to the frame 1 and which carries on its other end a block 75 which is engaged by the head 76 of a pin 77 fixed in the shaft 2. A coil spring 78, fastened at its end 79 to the supporting frame 1 and at its other end 80 to a lug 81 attached to the bell-crank 73, is provided to draw the block 75 into contact with the head 76 of the pin 77.

Figure 4:
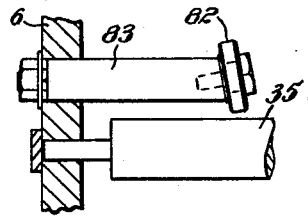
FIGURE 4 is a cross-sectional view taken on the line IV—IV of FIGURE 1.

Above the roller 35 (see FIGURE 4) a pair of inclined rollers 82, only one of which is shown, are provided for engaging, respectively, the shoulders of the tread strip profile to centralise the tread strip with respect to the circumferential centre line of the tyre building former. The rollers 82 are oppositely inclined relative to one another and are freely rotatably supported on axles 83 fixed one to each of the side member 6 and 7 of the frame 1.

The operation of the apparatus described above is as follows:

Unvulcanised rubber tread strip for application to a tyre carcass mounted on the rotatable former is fed over the rollers 33, 34 and 35, between the rollers 41 and 72, through the channel 27, past the cutter 11, over the guide bar 32 and on to the upper surface of the roller 29.

In order to apply the strip to the former the supporting frame 1 is raised, by the piston and cylinder (not shown) which is connected to the frame via the shackle 5, until the tread is pressed by the roller 29 into contact with the carcass. As the supporting frame 1 is raised, the head 76 of the pin 77 presses the block 75 to rotate the bell-crank 73 in an anti-clockwise direction about its pivot 74, thus raising the pressure roller 72 clear of the tread strip which then passes freely between the roller 72 and the roller 41, the tread strip being drawn on to its outer peripheral surface as it rotates.

When the former has nearly completed a revolution, a brake is applied to slow down the rate of rotation of the former. When the leading edge of the tread strip contacts the roller 71, the arm 70 is deflected and the switch 69 is operated to actuate a mechanism which stops the former from rotating and then applies pneumatic pressure to operate the cylinder and piston 67 to rotate the cutter 11 via the ratchet mechanism described above in a clockwise direction, as seen in FIGURE 1, from the position shown in FIGURE 1, through 360°. The tread strip is thus severed along the edge 20 of the blade 10.

The former is then rotated to draw the remaining portion of the severed length of the strip on to the former and the rotation of the former is continued for a further revolution to enable the roller 29 to consolidate the tread strip in position thereon. It should be noted that the roller 71 is positioned so that it causes the former to stop in a position such that the end of the remaining portion of the tread strip, when wrapped on to the former, will coincide exactly with the leading edge of the tread strip.

The cylinder and piston mechanism connected to the frame 1 by the pin 4 is then operated to lower the supporting frame 1 away from the former. As the frame 1 is rotated about the shaft 2, the head 76 of the pin 77 remains stationary, thus releasing the pressure on the block 75 and allowing the spring 78 to rotate the bell-crank 73 in a clockwise direction about its pivot 74 to move the pressure roller 72 towards the feed roller 41, thus gripping the tread strip between the rollers 72 and 41.

Figure 2:
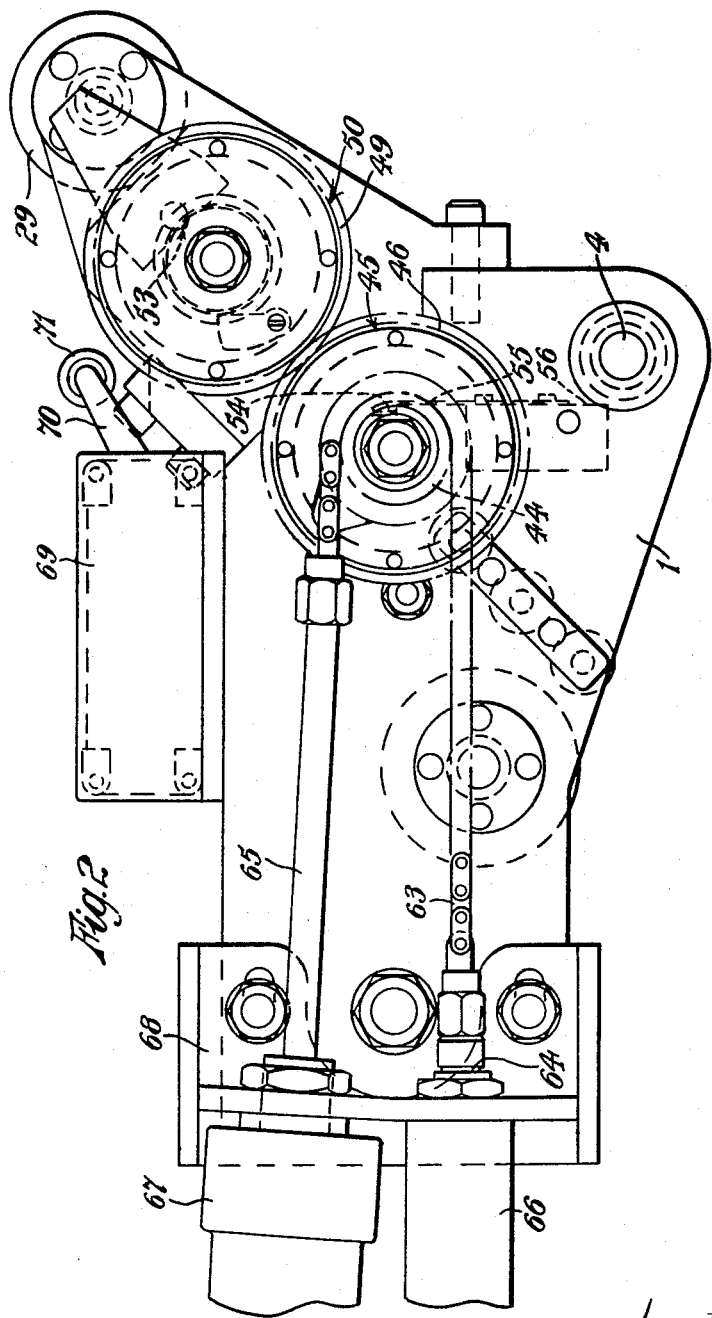
FIGURE 2 is a side elevation of the apparatus shown in FIGURE 1.

The cylinder and piston mechanism 66 is then actuated, rotating the sprocket 44 in a clockwise direction as seen in FIGURE 2, and driving the roller 41 through a complete revolution. This feeds a short length of tread strip through the channel 27, the strip passing over the projecting portion 16 of the cutter 11, the guide bar 32, and on to the roller 29 in readiness for the next operation of the apparatus to feed a length of tread strip to another tyre carcass. The projecting portion 16 of the cutter 11 and the guide bar 32 are provided to give an almost continuous support for the end of the tread strip as it moves past the cutter end on to the roller 29.

The sequence of operations described above, after initiation of the sequence by an operator, may be carried out entirely automatically by a conventional system of control devices arranged to be operated at the conclusion of each operation to initiate the next succeeding operation.

In the apparatus according to the invention, as a result of the tangential inclination of the guide channel with respect to the cutter, the cut provides tapered or chamfered ends to the cut lengths of tread rubber, thus enabling a scarf joint to be made between the ends of each strip when it is applied to the tyre carcass.

The apparatus described above also has the advantage that since the tread rubber is cut when nearly the whole length of the strip is already in a position, no significant error in the length of the strip to be applied to the former can arise. Tyres produced by the use of this apparatus are relatively free from defects caused by failure of the joint between the ends of the tread strip which may result from inaccurate cutting to length of the tread strip and the consequent necessity for an operator to stretch and distort the ends thereof in making a joint.

In an alternative mode of operation of the apparatus described above, the former may be rotated while the cutter is operating, the peripheral speed of rotation of the former being equal to the peripheral speed of the cutter. The helical knife blade then provides a cut at an inclined, i.e., bias angle with respect to the length of rubber. An advantage of a cut of this nature is that, contrary to the cut which is normally provided in tread rubber at right angles to the length of the rubber, no transverse weakness at 90° to the length of the tread rubber is formed. The bias cut is of greater length than the 90° cut and therefore provides a greater area for bonding at the joint, with the result that the joint strength is increased.

Having now described my invention, what I claim is:

1. Apparatus for severing a strip from a length of material which comprises a frame comprising a pair of parallel side members, means for pivotally supporting said frame at one end on an axis normal to said side members, a pressure roller rotatably mounted on and spanning the space between said side members on an axis parallel to the pivotal axis of said frame at the opposite end of said frame, a feed roller between said pivotal axis and said pressure roller rotatable between said side members on an axis parallel to said pivotal axis, a block between said feed roller and said pressure roller having an upper surface substantially tangent to the surface of said feed roller and extending toward said pressure roller, a fixed cutter element having a lower face spaced above the upper surface of said block to provide a channel for the passage of tread stock from said feed roller to said pressure roller and having a cutting edge transverse to the direction of movement of said length of material at the end of said lower face nearest said pressure roller, and a movable cutter movable from beneath said channel in a direction at an acute angle to the lower face of said fixed cutter element to cutting engagement with said cutting edge of said fixed cutter element to sever a strip of length of material with a chamfered edge.

2. The apparatus of claim 1 comprising means alternatively to rotate said feed roller and to move said movable cutter to the cutting edge of said fixed cutter element.

3. Apparatus for severing a strip from a length of sheet material comprising a fixed cutting element having a guide surface to guide said length of material and a surface at an angle to said guide surface to form a cutting edge transverse to the direction of passage of said length of material, a rotatable cutter having an axis of rotation parallel to the cutting edge of the fixed cutting element and having a cuting edge movable in an arc through the length of material adjacent to said guide surface and in cutting contact with the cutting edge of said fixed cutting element to sever a strip from said length with a chamfered cut edge, a feed roller to pass said length of material past the guide surface to the cutting edge of the fixed element, said feed roller being disposed on one side of the cutting edge of the fixed element, driving means for the feed roller and for the rotatable cutter comprising first and second gear rings disposed respectively, coaxially with the feed roller and with the rotatable cutter, first and second ratchets drivably connecting, respectively, the first gear ring with the feed roller and the second gear ring with the rotatable cutter, the ratchets being drivably operable alternately to rotate the feed roller and to rotate the rotatable cutter, and means to rotate the first gear ring alternately in opposite directions to effect alternate driving operations of the ratchets.

4. The apparatus of claim 3 in which said fixed cutting element comprises a knife blade having a surface which forms said guide surface and a surface at an angle to said guide surface to form therewith said cutting edge.

5. The apparatus of claim 3 in which the cutting edge of said rotatable cutter extends helically about the axis of rotation of said rotatable cutter.

6. The apparatus of claim 3 in which the means to rotate said first gear ring alternatively in opposite directions comprises a sprocket secured to said first gear ring, a chain trained over said sprocket and a pair of cylinders and a piston in each cylinder, one piston being secured to one end of said chain and the other secured to the other end of said chain, and means to operate said cylinders and pistons alternatively to rotate said gear rings alternatively through a complete revolution.

7. The apparatus of claim 6 which comprises a control actuated by contact with the leading edge of length of material to stop the feed roller and actuate the rotatable cutter, and stops engaging said feed roller and said rotatable cutter at each complete revolution.

8. Apparatus for severing a strip from a length of sheet material comprising a fixed frame, a pivotal frame pivotally mounted about an axis to said fixed frame, the pivotal frame having parallel side members, a fixed cutting element and a rotatable cutter extending between the side members, the fixed cutting element having a guide surface to guide said length of material and a surface at an angle to said guide surface to form a cutting edge transeverse to the direction of passage of said length of material, means to pass the length of material past said guide surface to said cutting edge, the rotatable cutter having an axis of rotation parallel to the cutting edge of the fixed element and having a cutting edge movable in and arc through the length of material adjacent to said guide surface and in cutting contact with the cutting edge of said fixed element to sever a strip from said length of material with a chamfered cut edge, and a consolidating roller having a rotational axis parallel to that of the rotatable cutter for pressing and consolidating a severed strip of material against a tyre building former upon pivotal movement of the pivotal frame in one direction.

9. The apparatus of claim 8 comprising means to support said pivotal frame at fixed positions of pivoting on said rigid frame.

10. The apparatus of claim 8 having guide rollers supporting the length of material to be severed by said cutter.

11. The apparatus of claim 8 comprising a block spaced from the guide surface of said fixed cutting element to form with said guide surface a passage for length of material.

12. The apparatus of claim 11 in which said block is spaced beneath said guide surface and said rotating cutter is positioned beneath said fixed cutting element.

13. The apparatus of claim 12 in which said rotatable cutter has a projection extending radially relative to the axis of rotation of said cutter from the side opposite said cutting edge to support a severed strip of the length of material as it passes beyond the cutting edge of said fixed cutting element.

14. The apparatus of claim 13 having a guide bar for severed strips of the length of material beyond said rotating cutter and a compacting roller beyond said guide bar so positioned that severed strips of the length of material pass over said guide bar and compacting roller.

References Cited by the Examiner
UNITED STATES PATENTS

| | | | |
|---|---|---|---|
| 1,119,180 | 12/14 | Krauth | 83—596 |
| 1,859,962 | 5/32 | Ferenci | 83—261 |
| 2,137,724 | 11/38 | Lester | 83—204 |
| 2,168,415 | 8/39 | Laukhuff | 83—283 |
| 2,518,011 | 8/50 | Hoppe | 83—349 |
| 2,810,437 | 10/57 | Hoitt | 83—261 |
| 2,814,345 | 11/57 | Repper | 83—596 |

ANDREW R. JUHASZ, *Primary Examiner.*

CARL W. TOMLIN, *Examiner.*